United States Patent
Blain et al.

(10) Patent No.: US 7,257,483 B2
(45) Date of Patent: Aug. 14, 2007

(54) METHOD AND APPARATUS FOR DETERMINING THE POSITION OF AN UNDERWATER OBJECT IN REAL-TIME

(75) Inventors: Michel Blain, Saint-Amable (CA); Régis Houde, Saint-Julie (CA); Richard Laliberté, Saint-Julie (CA)

(73) Assignee: Hydro-Québec, Montréal, Québec (CA)

( * ) Notice: Subject to any disclaimer, the term of this patent is extended or adjusted under 35 U.S.C. 154(b) by 0 days.

(21) Appl. No.: 11/376,300

(22) Filed: Mar. 16, 2006

(65) Prior Publication Data
US 2007/0106462 A1 May 10, 2007

Related U.S. Application Data

(63) Continuation of application No. PCT/CA2004/001734, filed on Sep. 23, 2004.

(51) Int. Cl.
*G01C 21/00* (2006.01)
(52) U.S. Cl. .................. 701/207; 701/21; 702/150
(58) Field of Classification Search ................ 701/21, 701/200, 207, 217; 702/150, 152, 153, 154; 700/245; 342/104, 106, 450, 459
See application file for complete search history.

(56) References Cited

U.S. PATENT DOCUMENTS

| | | | | |
|---|---|---|---|---|
| 3,795,911 A | * | 3/1974 | Hammack | 342/106 |
| 4,176,338 A | * | 11/1979 | Spindel et al. | 367/6 |
| 4,721,961 A | * | 1/1988 | Busignies et al. | 342/458 |
| 5,928,309 A | | 7/1999 | Korver et al. | |
| 6,539,327 B1 | * | 3/2003 | Dassot et al. | 702/150 |
| 6,937,539 B2 | * | 8/2005 | Kervern et al. | 367/129 |
| 7,139,647 B2 | * | 11/2006 | Larsen | 701/21 |
| 2003/0078706 A1 | | 4/2003 | Larsen | |
| 2004/0039509 A1 | | 2/2004 | Bread | |

\* cited by examiner

*Primary Examiner*—Gary Chin
(74) *Attorney, Agent, or Firm*—Ogilvy Renault, LLP (57) ABSTRACT

A method and apparatus is disclosed for providing a determined position in real-time of an underwater object using a plurality of sensors operating at various sampling rates and for using the determined position in real-time in order to perform inspection tasks inter alia.

23 Claims, 8 Drawing Sheets

METHOD AND APPARATUS FOR DETERMINING THE POSITION OF AN UNDERWATER OBJECT IN REAL-TIME

CROSS-REFERENCE TO RELATED APPLICATIONS

This application is a continuation of, and claims priority from, PCT application Ser. No. PCT/CA2004/001734, filed on Sep. 23, 2004 and entitled "Method and Apparatus for Determining the Position of an Underwater Object in Real-Time", which claims priority from U.S. provisional application No. 60/504,967 filed on Sep. 23, 2003, the specifications of which are hereby incorporated by reference.

TECHNICAL FIELD

This invention relates to the field of robotics. More precisely, this invention pertains to the field of determining the position of an underwater remotely operated vehicle in real-time.

BACKGROUND OF THE INVENTION

As part of a water dam security program, an underwater remotely operated vehicle (ROV) has been under development for the past few years. Such remotely operated vehicle may be used in various inspection tasks taking place in underwater environments. The vehicle is preferably used for the inspection of dam surfaces, of rock concrete interface, of underwater equipment related to turbine production and in order to locate and size major defects.

Someone skilled in the art appreciates that over the years, deterioration of the dam concrete and other immerged elements needs to be repaired. Inspection is therefore performed in order to prepare rehabilitation work. Obstruction of water intake is also inspected prior to cleaning process.

As the remotely operated vehicle inspects the dam, cracks or defects on the surface are identified using for instance an on-board camera, precisely located and the remotely operated vehicle is reproduced in a virtual environment. The virtual environment consists of a complete scaled graphical model of the dam (as disclosed for instance in Côté, J., Lavallée, J. "Augmented Reality Graphic, Interface for Upstream Dam Inspection", SPIE, Telemanipulator and Telepresence Technologies II, Philadelphia, October 1995) and the graphical and dynamical model of the submarine. Later on, maintenance crews will return to the identified defects to follow their evolution in time or to perform restoration work. In order to perform such tasks efficiently, the remotely operated vehicle must be equipped with a precise navigation system, giving its exact position relative to the dam in real-time. State of the art navigation systems do not provide real-time navigation for underwater vehicles because the sampling rate for measuring position and the precision of the system are usually not high enough.

In an environment where visibility in water is very low or when the structure of the dam is very complex, a navigation system providing real time positioning is necessary to locate the remotely operated vehicle.

There is therefore a need for a method and apparatus that will overcome the above-identified drawbacks.

SUMMARY OF THE INVENTION

It is an object of the invention to provide a method for providing a real-time positioning of a remotely operated vehicle operating under water.

Another object of the invention is to provide an apparatus for positioning in real-time a remotely operated vehicle operating under water.

According to a first aspect of the invention, there is provided a method for determining a position in real-time for a remotely operated vehicle capable of moving underwater at a maximum velocity, the method comprising sampling a position of the vehicle at a first sampling frequency, sampling an instantaneous velocity of the vehicle at a second sampling frequency independent from the first sampling frequency, wherein the result of the division of a distance, traveled by the remotely operated vehicle between two velocity samplings, by a period between the two velocity samplings is smaller than or equal to the maximum velocity and determining, from the vehicle position information and the vehicle velocity, a position in real-time for the vehicle.

According to another aspect of the invention, there is provided an apparatus for determining a position in real-time for a remotely operated vehicle capable of moving underwater at a maximum velocity, the apparatus comprising a position sensor unit providing a sampled position signal of the vehicle at a first sampling frequency, an instantaneous velocity sensor unit providing a sampled instantaneous velocity signal at a second sampling frequency independent from the first sampling frequency, wherein the result of the division of a distance, traveled by the remotely operated vehicle between two velocity samplings, by a period between the two velocity samplings is smaller than or equal to the maximum velocity and a navigation unit receiving the sampled position signal and the sampled instantaneous velocity signal and determining a position signal in real-time for said vehicle.

According to another aspect of the invention, there is provided a method for determining a position underwater in real-time of an object, the method comprising sampling an estimation of the position of the object at a first given frequency, with a mean position error equal to zero, sampling an estimation of at least one of a velocity and an acceleration of the object at a second given frequency higher than the first given frequency, resulting in a position estimate with a mean error which is not equal to zero and combining the estimation of the position with the estimation of at least one of a velocity and an acceleration to provide the position at the second given frequency.

According to another aspect of the invention, there is provided an apparatus for determining a position in real-time of an object underwater, the apparatus comprising a position sensor unit having a mean error equal to zero for providing an estimated position signal of the object at a first given frequency, at least one of an instantaneous velocity sensor unit and an acceleration sensor unit for providing at least one of a corresponding instantaneous velocity signal and a corresponding instantaneous acceleration signal at a second given frequency higher than the first given frequency and a position providing unit receiving and combining the estimated position signal and the at least one of a corresponding instantaneous velocity signal and a corresponding sampled instantaneous acceleration signal to provide the position signal in real-time at the second given frequency.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
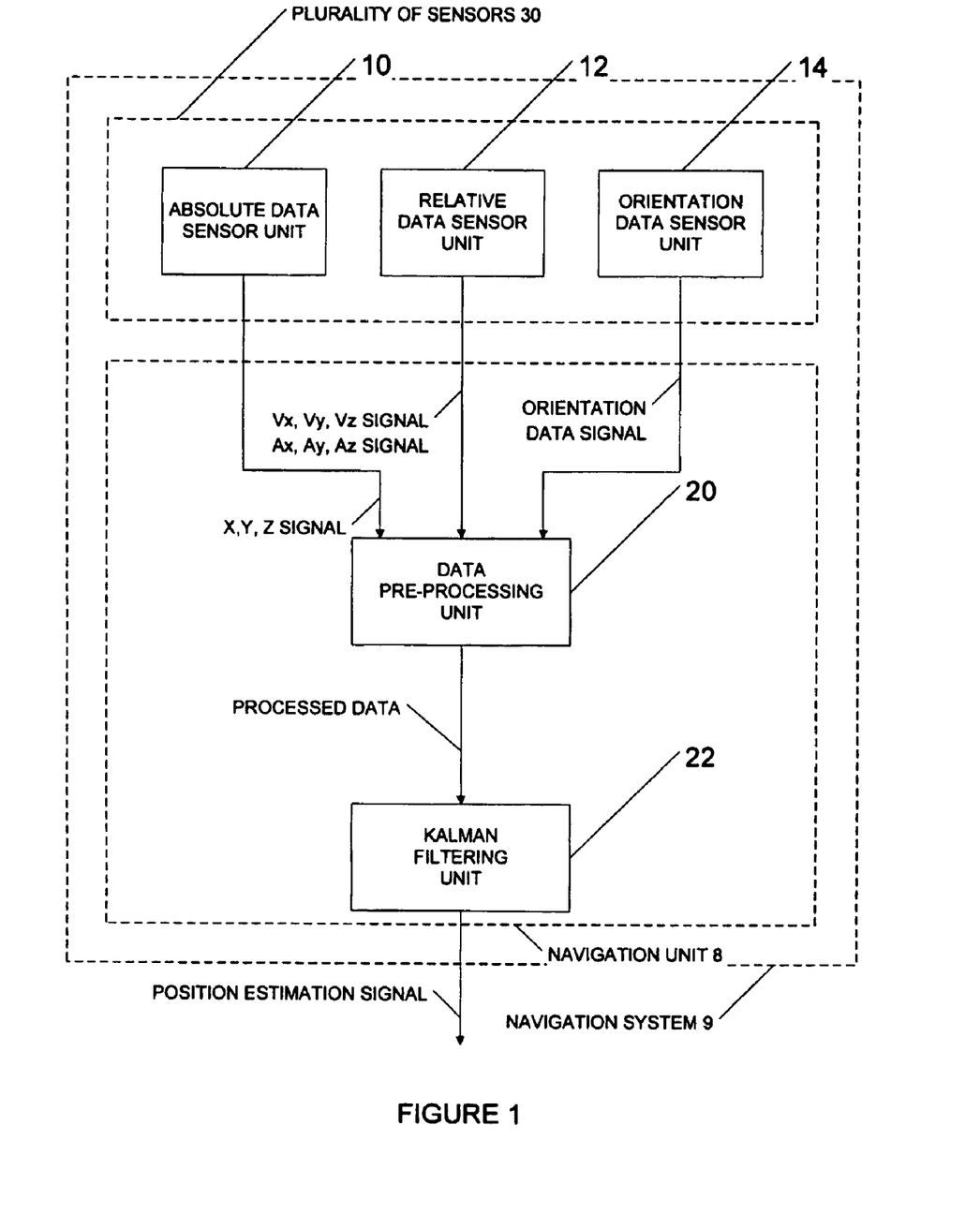
FIG. 1 is a block diagram which shows a visualization system in accordance with a preferred embodiment of the invention.

Now referring to FIG. 1, there is shown a block diagram which shows a navigation system 9 in accordance with a preferred embodiment of the invention.

A navigation system comprises a data pre-processing unit 20 and a Kalman filtering unit 22.

It will be appreciated that in the case where a failure/malfunction of a given sensor is detected, the data provided by the given sensor is discarded.

The data pre-processing unit 20 receives a X, Y, Z signal originating from an absolute data sensor unit 10, a velocity signal (Vx, Vy, Vz) and an acceleration signal Ax, Ay and Az provided by a relative data sensor unit 12 and an orientation data signal provided by an orientation data sensor unit 14.

The absolute data sensor unit 10 provides an absolute position data signal at a first sampling frequency with a mean position error equal to zero. It will be appreciated that in one embodiment of the invention, the absolute data sensor unit 10 may be referred to as a position sensor unit.

The relative data sensor unit 12 provides a relative data signal at a second sampling frequency. It will be appreciated that in one embodiment of the invention, the relative data sensor unit 12 may be referred to as a instantaneous velocity sensor unit. In fact, such relative data sensor unit 12 provides an instantaneous velocity, resulting in a position estimate with a mean error which is not equal to zero.

It will be appreciated that the second sampling frequency is substantially higher than the first sampling frequency.

It will be appreciated that the absolute data sensor unit 10 comprises at least one of a bathymeter providing a Z signal and an acoustic sensor providing an X and Y signal.

It will further be appreciated that the relative data sensor unit 12 comprises at least one of a Doppler sensor providing a Vx, Vy and Vz signal and an accelerometer providing an Ax, Ay and Az signal.

It will further be appreciated that the orientation data sensor unit 14 comprises at least one of gyroscope sensors providing $\Omega_x$, $\Omega_y$ and $\Omega_z$ signal, an inclinometer providing $\Omega_x$ and $\Omega_y$ signal and a compass providing a $\Omega_z$ signal.

The data pre-processing unit 20 pre-processes the received data and provides processed data to the Kalman filtering unit 22.

As explained below, the Kalman filtering unit 22 provides a position estimation signal.

In the preferred embodiment of the invention, the remotely operated vehicle navigation system comprises a plurality of sensors 30, providing information on the vehicle's position and movement, and a navigation unit 8. Preferably, sensor data provided by the plurality of sensors 30 is redundant in order to improve position estimates and overcome sensor failures.

As disclosed below, the navigation unit 8 uses sensor data provided by the plurality of sensors 30 and evaluates the best possible estimate of the position of the vehicle. As disclosed below, the navigation unit 8 operates using Kalman filtering techniques in the preferred embodiment.

More precisely, the navigation unit 8 merges the position signal provided by the absolute data sensor unit 10 and the velocity signal provided by the relative data sensor unit 12 using an orientation signal provided by the orientation data sensor unit 14 in order to provide a real-time position estimation signal.

In the preferred embodiment, the absolute data sensor unit 10 comprises a bathymeter sensor unit providing a Z signal and an acoustic sensor unit providing an X and Y signal.

Still in the preferred embodiment of the invention, the relative data sensor unit 12 comprises a Doppler sensor unit providing a Vx, Vy, Vz signal and an accelerometer sensor unit providing an Ax, Ay, Az signal.

The orientation data sensor unit 14 comprises, in the preferred embodiment of the invention, a gyroscope sensor unit providing an $\Omega_x$, $\Omega_y$ and $\Omega_z$ signal, an inclinometer providing an $\Omega_x$ and $\Omega_y$ signal and a compass providing a $\Omega_z$ signal. It will be appreciated that redundancy is advantageously used in order to avoid sensor failures.

Prior art work related on navigation systems which uses Doppler sensors and acoustic sensors may be found in Whitcomb, L. L., Yoerger, D. R., Hanumant, S. "Combined Doppler/LBL Based Navigation of Underwater Vehicles," Proc. of the 11th International Symposium on Unmanned Untethered Submersible Technology, Durham, N. H., August 1999 and in Spindel, R. C., Porer, R. P., Marquet, W. M., Durham, J. L. "A high-resolution pulse-Doppler underwater acoustic navigation system." IEEE Journal of Oceanic Engineering, Vol.OE-1, No. 1, pp. 6-13, 1976).

Someone skilled in the art will appreciate that in real systems, sensors do not always send data at a fixed rate and data acquisition is often intermittent. So additional developments take place to deal with asynchronous data delivery and delays in measurements. A delay in a measurement is preferably defined as the time between a moment where a measurement is valid and a moment where it is available to the navigation unit.

It will be appreciated that the navigation unit is preferably adapted to accept various rates of data originating from the plurality of sensors 30. Furthermore a filter switching process is used to ensure that only valid data is used for the position estimate.

It will be appreciated that the gyroscope and accelerometer sensor unit, usually provides position, linear velocities and accelerations, orientation, and angular velocities. However, in the preferred embodiment of the invention, only orientation, angular velocities, and accelerations are provided by the gyroscope and accelerometer sensor unit.

As disclosed previously, the plurality of sensors of the navigation system 9 comprise the acoustic sensor unit which provides the X, Y, Z signal of a sonar transducer mounted on the submarine.

It will be appreciated that the position signal provided by the acoustic position sensor unit and the Z signal provided by the bathymeter sensor unit are combined together to provide the absolute position signal. It will be appreciated that, in the preferred embodiment of the invention, the Z signal is collected from the bathymeter sensor unit rather than from the acoustic position sensor unit as the bathymeter sensor unit provides a much more accurate, faster and reliable measure.

As explained above, the relative data sensor unit 12 of the plurality of sensors 30 of the navigation system 9 further comprise a Doppler velocity sensor unit, commonly identified as DVL, and which provides a X, Y, Z linear velocity signal of the vehicle. Upon integration of the linear velocity signal of the vehicle, position X, Y, and Z is provided.

In the preferred embodiment, the plurality of sensors 30 have the following characteristics:

As described by following equations 1 and 2, the optimal estimate from the previous iteration, noted X(k−1) is projected in time through state transition matrix A, and the noisy inputs U(k) (relative data sensor unit) are fed to the system through matrix B, relating the inputs to the state.

$$P_{priori} = A \cdot P \cdot A' + Q \quad (1)$$

$$X(k) = A \cdot X(k-1) + B \cdot U(k) \quad (2)$$

In equation 2, the state X is the linear position of the vehicle and U is the input from a linear velocity sensor. Matrices A and B reflect the kinematics of the system.

Equation 1 projects in time the error covariance matrix P, representing the variance of the error on the estimate state X. Q is the covariance matrix associated with the process noise from the measurements U(k).

This process is formalized by Equations 3 to 5, in which direct noisy state measurements Z(k) coming from the absolute sensor unit 10 are compared with the prior state estimate $X(k_{past})$, yielding a correction to apply to this prior

| Instrument | Variable | Sampling frequency | Precision | Range | Variance |
|---|---|---|---|---|---|
| DVL (RDI 1200) | Vx, Vy, Vz | 6 Hz | ±0.2% ±1 mm/s | 0.5–30 m | 0.00009 |
| Acoustic positioning system (Linquest TrackLink 1500HA) | X, Y Position | 0.25 Hz | ±0.2 m ±0.5% of distance | 120° cone over 1500 m | 0.005 |
| Bathymeter (Paroscientific 8CDP270-I) | Z Position | 5 Hz | ±1 cm | 0–270 m | 0.000013 |

Kalman filters are well covered in Brown, R. G., Hwang, P. Y. C. Introduction to Random Signals and Applied Kalman Filtering, 3$^{rd}$ edition, John Wiley & Sons, 1997. As known by someone skilled in the art, a Kalman filter uses an optimal linear estimator based on an iterative and recursive process.

More precisely, the Kalman filter recursively evaluates an optimal estimate of the state of a system. Typically, a vector describing the state of a vehicle evolving in a 3D space may be expressed as $$x = [x\ y\ z\ \dot{x}\ \dot{y}\ \dot{z}\ \alpha\ \beta\ \gamma\ \Omega_x\ \Omega_y\ \Omega_z]'$$

where x y z are position coordinates of the vehicle, $\dot{x}\ \dot{y}\ \dot{z}$ are corresponding velocities, α β γ are Euler angles describing the orientation of the vehicle and $\Omega_x\ \Omega_y\ \Omega_z$, are the angular velocities.

In the preferred embodiment, the Kalman filter used, in the Kalman filtering unit 22, applies only to the position of the vehicle. X vector is defined as $x=[x\ y\ z\ \dot{x}\ \dot{y}\ \dot{z}]'$.

The Kalman filter produces a new estimate of the position of the vehicle when one of the following situations occurs. If a new position signal originating from the acoustic position sensor unit is available, then the Kalman filter of the Kalman filtering unit 22 computes the new estimate with the new position signal (measurement update process). If there is no new position signal available before a fixed amount of time dt, then the Kalman filter updates a current position based on previous information of position and velocity (time update process).

estimate to obtain the new estimate X(k). Matrix H relates the measurements to the state.

$$K = P_{priori} \cdot H' \cdot (H \cdot P_{priori} \cdot H' + R)^{-1} \quad (3)$$

$$X_{corrigé}(k_{past}) = X(k_{past}) + K \cdot (Z - H \cdot X(k_{past})) \quad (4)$$

$$P = (I - K \cdot H) \cdot P_{priori} \quad (5)$$

The importance of each estimation (the prior estimate $X(k_{past})$ and the measurement Z(k)) is determined by the Kalman gain K.

The Kalman gain K is in turn determined by matrices Q and R, which respectively represent the process noise covariance (indirect measurements) and the measurement noise covariance (direct measurements). The Kalman gain K takes a value between 0 and 1, 0 representing the use of the indirect measurements only, 1 representing the direct measurements only.

The error covariance matrix P, modified in equation 1, is again corrected in equation 5 in order to reflect the measurement update process. Continuing with the previous example, Z(k) in equation 4 represents a measurement coming from a position sensor and H is equal to [1 0] since there is direct correspondence between Z and X.

Figure 2:
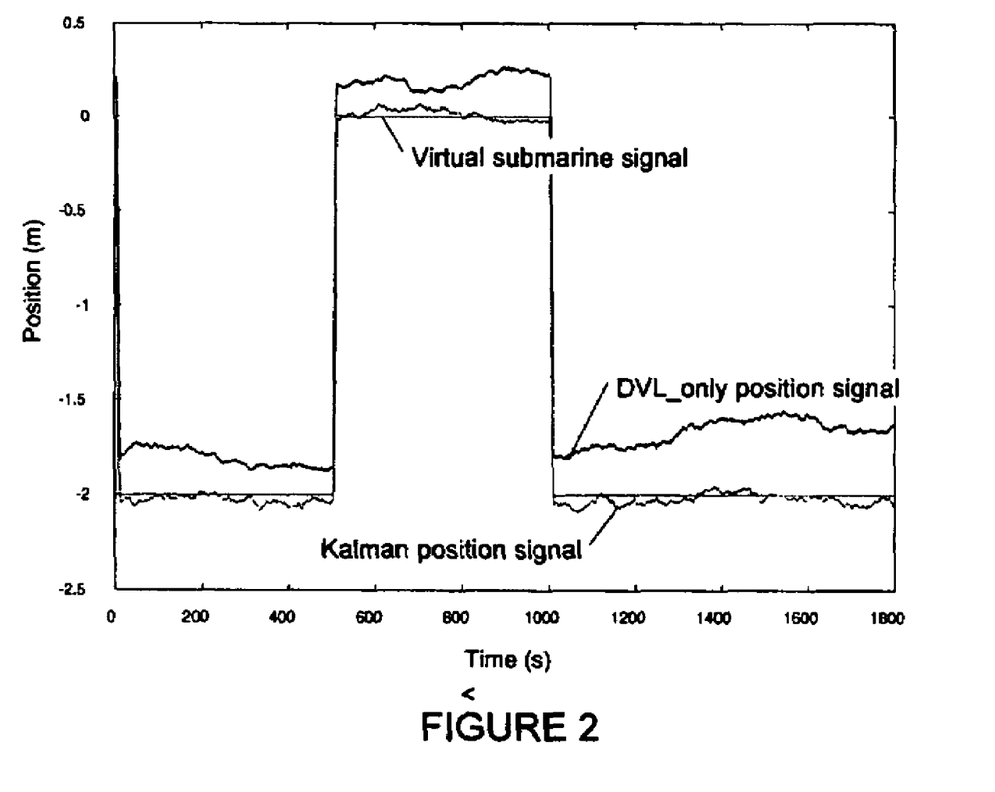
FIG. 2 is a graph which shows Kalman filter compensation for position drift of the Doppler velocity sensor unit 14.

The noise originating from the Doppler velocity sensor unit is accumulated over every iteration because the velocity is integrated to obtain the position. This results in a diverging position error and therefore the acoustic position sensor unit alone becomes unusable over long periods of time as shown in FIG. 2. The position error of a typical direct position sensor, such as the acoustic position sensor unit is important. These systems are subject to intermittence and have larger noise levels over short periods of time. However, their position estimates do not drift over time. The error is close to zero-mean, which makes them more reliable on the long run.

The position estimation signal obtained from the Kalman filtering unit 22 combining both the acoustic position sensor unit and the Doppler velocity sensor unit have been simulated. The results of the simulation are shown in FIG. 2.

As shown in FIG. 2, the combination takes advantages from both the acoustic position sensor unit and the Doppler velocity sensor unit and more precisely of the absence of drift from the acoustic position sensor unit and the smoothness of the velocity signal provided by the Doppler velocity sensor unit.

However, it will be appreciated that the basic Kalman filtering unit 22, which was used for generating the results of the simulation in FIG. 2, does not satisfy the precision required by the application. First, the position signal provided by the acoustic position sensor unit is not valid at the time it becomes available, but at a certain amount of time before. Second, if a sensor fault occurs, it must be detected and the Kalman filtering unit 22 should not incorporate data provided by the faulty sensor in a new estimate. Finally, the update rate of the plurality of sensors may vary with each sensor. For example, if the vehicle is far from the transponder beacons, the measure will take more time as an acoustic signal is dependent from a distance to the transponder beacons.

It will be appreciated that in the preferred embodiment of the invention, data originating from each sensor preferably require some transformations before being sent to the Kalman filtering unit 22.

More precisely, the kinematics model of the vehicle describes its movement relative to an inertial frame called fixed frame. For convenience, the dynamic equations of the vehicle are developed relative to its center of mass. A reference frame identified as local is attached to the center of mass and its orientation corresponds to the principal axis of inertia. Therefore, the position signal and the velocity signal obtained from the plurality of sensors 30 is preferably transformed in order to describe the position and velocity of the local frame relative to the fixed frame expressed in the fixed frame.

In the preferred embodiment, such processing is performed by the data pre-processing unit 20.

The position signal provided by the acoustic position sensor unit is processed as follows.

$$[^{FIXE}P_{LOCAL}]_{FIXE} = [^{FIXE}P_{PINGER}]_{FIXE} - rot\{FIXELOCAL\}[^{LOCAL}P_{PINGER}]_{LOCAL}$$

where $[^{FIXE}P_{LOCAL}]_{FIXE}$ is the position vector of the center of mass of the vehicle with respect to the fixed frame, $[^{FIXE}P_{PINGER}]_{FIXE}$ is the position vector of the transponder (the emitter portion of the acoustical system, and thus the point whose position is measured by the acoustical system) of the vehicle with respect to the fixed frame, where rot{FIXELOCAL} is a rotation matrix for moving from a local frame to the fixed frame in the past. The matrix is built using the orientation provided by the DQI (rot{FIXE,DQI}) and its orientation on the vehicle (rot{LOCAL,DQI}).

$[^{LOCAL}P_{PINGER}]_{LOCAL}$ is the position vector of the transponder with respect to the center of mass of the vehicle and it is measured in the frame of the vehicle.

The velocity signal provided by the Doppler velocity sensor unit is processed as follows.

$$[^{FIXE}V_{LOC}]_{FIXE} = ROT\{FIXE,DVL\}[^{FIXE}V_{DVL}]_{DVL} - [^{FIXE}\Omega_{LOC}]_{FIXE} \wedge (ROT\{FIXE,LOC\}[^{LOC}P_{DVL}]_{LOC}),$$

where ROT{FIXE DVL} is the rotation matrix describing the orientation of the Doppler velocity sensor unit relative to the fixed frame.

$[^{FIXE}V_{DVL}]_{DVL}$ is obtained using the Doppler velocity sensor unit.

$[^{FIXE}\Omega_{LOC}]_{FIXE}$ is the angular velocity of the local frame obtained from the gyroscope sensor unit.

$[^{LOC}P_{DVL}]_{LOC}$ is the position vector of the Doppler velocity sensor unit relative to the local frame expressed in the local frame.

As explained previously, sensors data are provided by the plurality of sensors 30 at different and changing rates.

It will be appreciated that the sensor fusion algorithm accepts asynchronous signals by switching to the appropriate estimation procedure depending on which signal is provided. For instance, the Doppler velocity sensor unit provides the velocity signal at a rate approximately 12 times higher than the rate at which the position signal is provided by the acoustic position sensor unit.

When the Doppler velocity sensor unit and the acoustic position sensor unit provide new data, the Kalman filter unit 22 is used. However, 11 times out of 12 only the Doppler velocity sensor unit provides the velocity signal, and so a simple integration of the velocity signal is used in order to perform the position update, such integration is performed in the Kalman filtering unit 22.

A time stamp is recorded when a position signal is provided by the acoustic position sensor unit. The value of the time stamp is the actual time less a calibrated delay. This time stamp is associated with the position signal.

The position estimate between two position signals is kept in memory. When a new position signal is provided by the acoustic position sensor unit, the algorithm performs a correction on the position estimate recorded in the memory at the time indicated by the time stamp associated with this new data. Then position updates are performed from this time to the actual time using the velocity signal provided by the Doppler velocity sensor unit. In other words, the position update $X(k_{past})$ of Equation 4 is replaced by the new position estimate and then the position is updated by integrating the velocity signal from this new position estimate in the past to the actual time using Equation 2. This integration phase continues until a new position signal provided by the acoustic position sensor unit becomes available. In the preferred embodiment, such processing is performed by the Kalman filtering unit 22.

The data are generated with the dynamic model of the vehicle and its corresponding controller. On FIG. 2 and further, the real position of the model is identified as Virtual submarine signal. A white noise with variance obtained from experimentations, as shown above, is added to the Virtual submarine signal positions in order to generate the position signal provided by the acoustic position sensor unit.

The velocity signal provided by the simulated Doppler velocity sensor unit is obtained from the velocity of the model. The position signal provided by the acoustic position sensor unit is identified as "V Positioning signal" and the Doppler velocity sensor unit is identified as "DVL_only position signal" while the position estimate provided by the Kalman filtering unit is identified as "Kalman position signal".

The results of the first simulation, shown in FIG. 2, shows the Kalman position signal provided by the Kalman filtering unit 22, of the position signals provided using the acoustic position sensor unit and the velocity signal provided by the data Doppler velocity sensor unit.

The vehicle starts at position zero, then reaches the first target at −2 m. At time t=500 seconds, the vehicle reaches the position target 0 m and returns to the −2 m target at time t=1000 seconds. The purpose of the simulation is to validate the adequate execution of the Kalman filtering unit 22. The position signal provided by the acoustic position sensor unit are not shown in this graph for clarity. The position drift for the Doppler velocity sensor unit, and shown by the "DVL_only position signal", is very slow and the error becomes significant only after one hour of simulation. The data plotted on this graph represents 30 minutes of simulation starting after four hours of simulation.

It will be appreciated that in this simulation, the position signal provided by the acoustic position sensor unit is generated instantaneously (i.e. without delay), there are no calibration errors on any systems and no sensor failures in this simulation.

Figure 3:
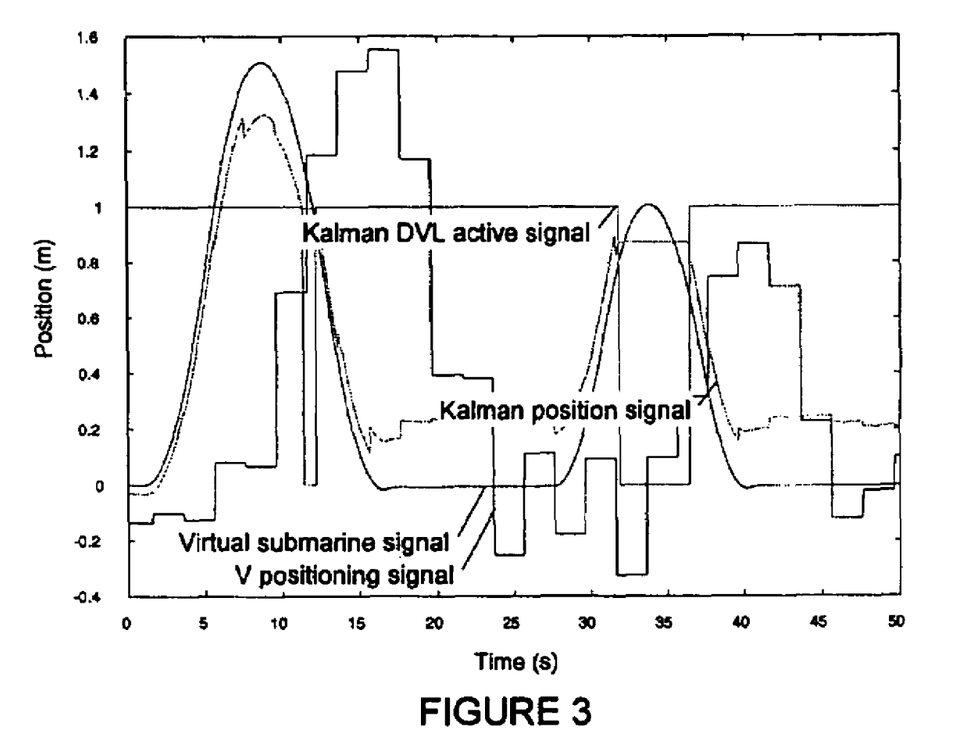
FIG. 3 is a graph which shows impact, on position estimate, of the acoustic position delay and Doppler velocity sensor unit 14 failures.

Now referring to FIG. 3, there is shown a graph which shows a simulation intended to disclose the impact of delays in the acoustic position sensor unit and failures in the Doppler velocity sensor unit.

A delay of 5 seconds is set for the acoustic position sensor unit. Also, in order to amplify the impact of the position signal provided by the acoustic position sensor unit on the position estimate, the variance related to the acoustic position sensor unit is set to 0.002. During the first 10 seconds, the effect of the delay is that the Kalman position signal curve is behind the Virtual submarine signal curve.

Failure of the Doppler velocity sensor unit 14 occurs at 11 seconds where the Kalman DVL active signal curve changes from level one to level zero and become active again at 12 seconds. During the failure time, the Kalman filtering unit 22 considers the Doppler velocity sensor unit input as zero value. Delays in the acoustic position sensor unit and failures in the Doppler velocity sensor unit are inherent to this navigation system.

At 20 seconds after the beginning of the simulation, the accumulated error of the delay in the acoustic position sensor unit and the failure of the Doppler velocity sensor unit is approximately 20 cm.

Figure 4:
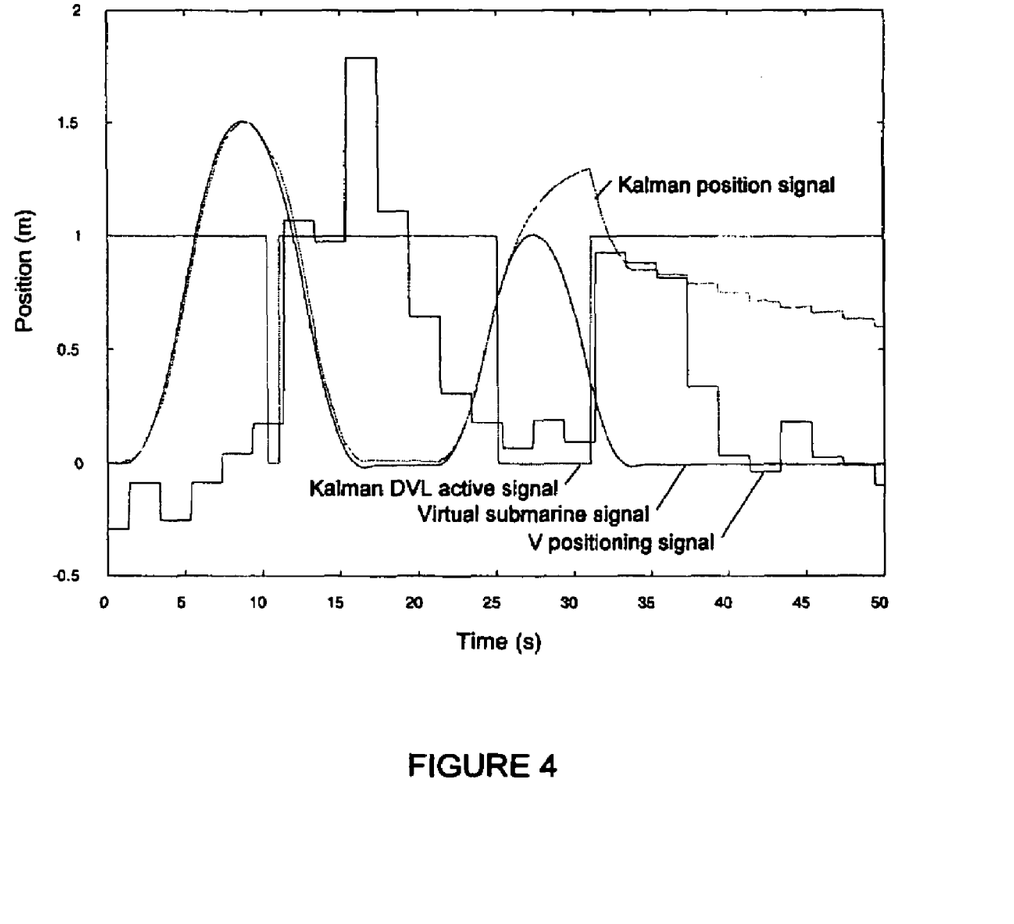
FIG. 4 is a graph which shows position estimate corrected for the acoustic position delay and Doppler velocity sensor unit 14 failures.

Now referring to FIG. 4, there is shown a further simulation which discloses corrections made for the delay in the acoustic position sensor unit and for the failure of the Doppler velocity sensor unit. The description of the correction applied for the delay in the acoustic position sensor unit has been disclosed previously. The correction applied in the case of the failure of the Doppler velocity sensor unit is very simple in this algorithm and it works fine for small period of time. The algorithm keeps the last valid velocity signal and performs the time update procedure with it. Then the valid velocity is reduced for a certain percentage and the result becomes the new valid velocity for the next time update.

For a longer period of time, the algorithm stops to perform the time update procedure and the controller changes from automatic to manual mode.

During the first 10 seconds of the simulation, the position estimate curve (i.e. "Kalman position signal" curve) follows the position curve (i.e. "Virtual submarine signal" curve) of the model. This represents an improvement compared to the previous simulation. The first Doppler velocity sensor unit failure occurs at 11 seconds as shown by the "Kalman DVL active signal" curve. While there is still a deviation of the position estimate relative to the position of the vehicle, the position error generated by the failure of the Doppler velocity sensor unit is small compared to the one obtained in the previous simulation. At 20 seconds after the beginning of the simulation, the accumulated error of the delay and Doppler velocity sensor unit failure is less than 5 cm. On the other hand, for a failure of the Doppler velocity sensor unit lasting for more than 5 seconds, as the one starting at 25 seconds, the use of the last valid velocity generates an important error because the vehicle changes its velocity direction during the failure of the Doppler velocity sensor unit. However, as time passes, the position estimate curve is coming closer by small steps to the vehicle position curve under the influence of the acoustic position sensor unit while the vehicle is at rest.

Figure 5:
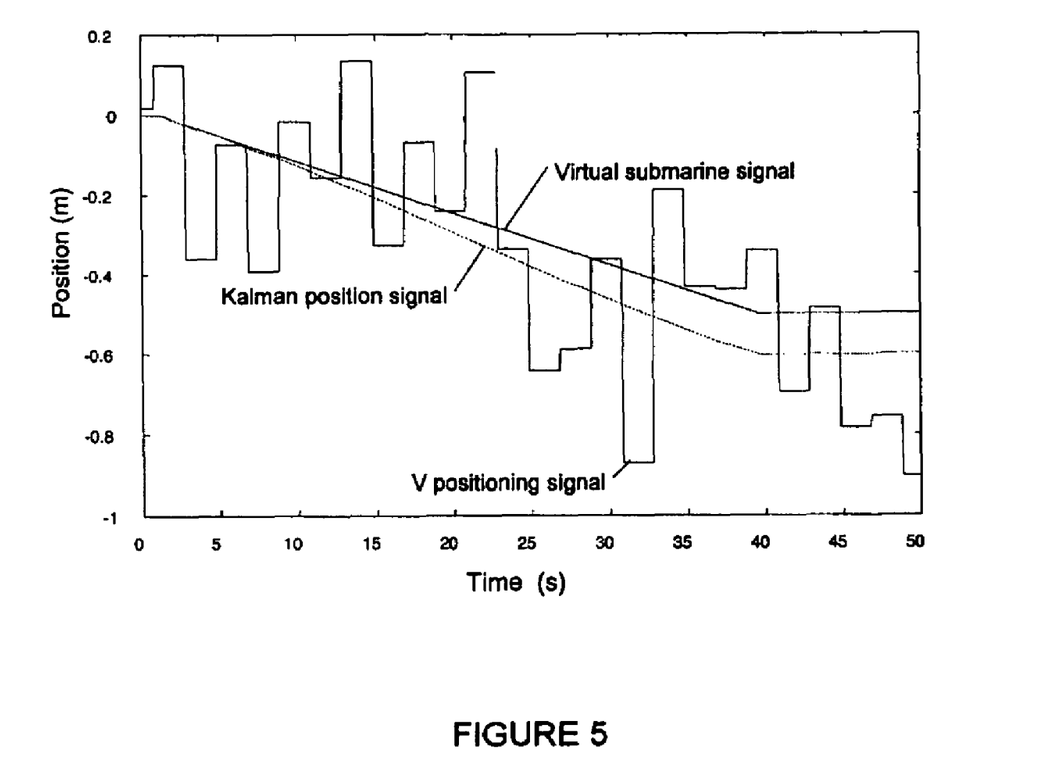
FIG. 5 is a graph which shows calibration errors effect on the position of the Doppler velocity sensor unit 14 system.

The velocity signal provided by the Doppler velocity sensor unit system is the linear velocity of one particular point on the vehicle. The transformation applied to the velocities depends on the angular velocities and the position coordinates of the centre of the Doppler velocity sensor unit system relative to the local frame. This transformation is necessary and the calibration should be done accurately. In the next simulation, shown in FIG. 5, the Doppler velocity sensor unit is located at (−25 cm, 0, 25 cm) relative to the local frame. However, an error of 5 cm relative to the X and Z axis is made so this transformation considers that the Doppler velocity sensor unit system is located at (−20 cm, 0, −20 cm). The position drift is dependent on the angular displacement and it can be observed from FIG. 5 that a small error in the Doppler velocity sensor unit position generates considerable error on the position of the vehicle.

Figure 6:
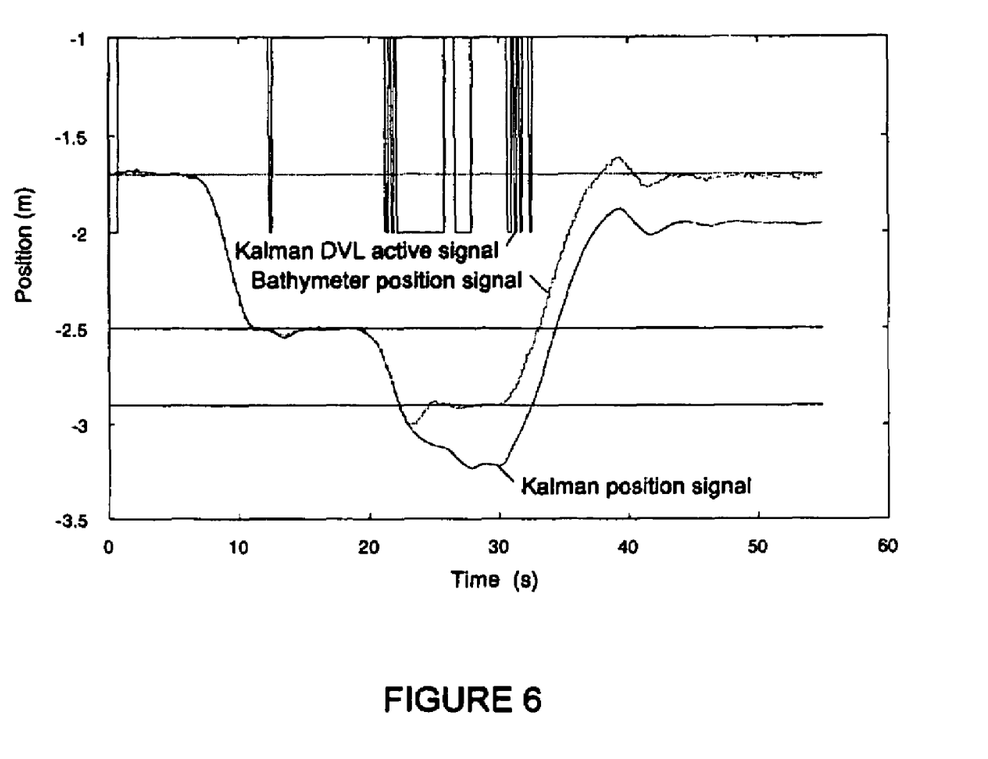
FIG. 6 is a graph which shows experimental results of the impact of Doppler velocity sensor unit 14 failures on the position estimates.

The Bathymeter sensor unit is used for providing the Z coordinate and replaces the acoustic position sensor unit used for the Z coordinate in simulation. However, the interest is more on the observation of the behaviour described previously than on reproduction of the simulation results. In the following figures, the absolute sensor is the bathymeter and the corresponding curve is identified as "Bathymeter position signal". The Bathymeter sensor unit is accurate and it can be considered as a reference to establish a point of comparison with the curve obtained from the Kalman filtering unit 22. The position curve obtained by simple integration of the velocity signal provided by the Doppler velocity sensor unit is not plotted. However, the velocity signal provided by the Doppler velocity sensor unit is the only data used in the Kalman filtering unit 22 so the Kalman position signal curve represents the position computed using the Doppler velocity sensor unit. The "Kalman DVL active signal" curve indicates whether the Doppler velocity sensor unit is active (up level) or not (down level). In FIG. 6, the Doppler velocity sensor unit system has failed many times. For a short time failure, the use of the preceding velocity allows the Kalman filtering unit 22 to keep its curve on the Bathymeter sensor unit curve. However, if the Doppler velocity sensor unit is down for a longer period, the Kalman filtering unit does not give acceptable results. There is an example of that situation starting at 22 seconds in FIG. 6.

Figure 7:
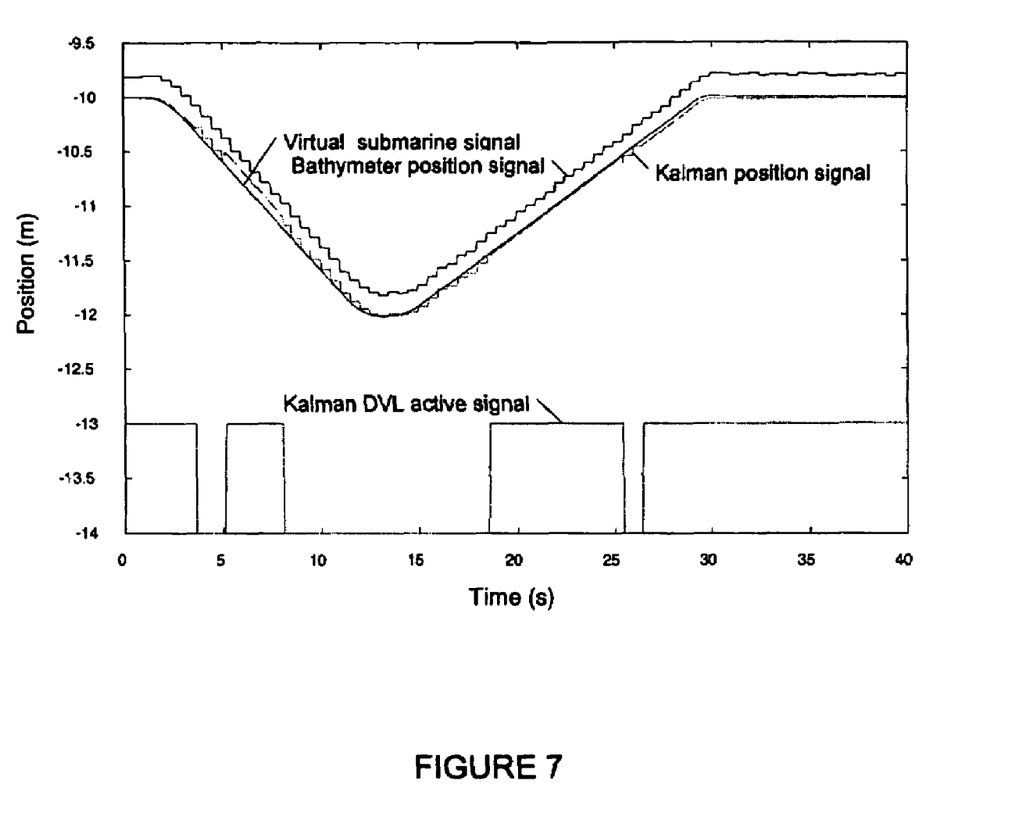
FIG. 7 is a graph which shows experimental results of the Z position estimate during Doppler velocity sensor unit 14 failures.

For the Z coordinate, since the Bathymeter sensor unit has a fairly good accuracy and has a relatively high bandwidth, the algorithm uses its signal during a Doppler velocity sensor unit failure instead of performing the time update using the preceding valid velocity as shown in FIG. 7.

A navigation system which uses a Kalman filtering unit to merge data received from an acoustic position sensor unit, a Bathymeter sensor unit and a Doppler velocity sensor unit has been disclosed. The impact of the delay from the position signal provided by the acoustic position sensor unit and the failure of the Doppler velocity sensor unit on the position estimate have been highlighted by simulation results. The algorithm of the Kalman filtering unit 22 comprises a correction for a fixed time delay of the acoustic position sensor unit and the simulation results shows an appreciable improvement of the position estimate.

However it is known by someone skilled in the art that the time delay is not fixed. A model of this time delay may therefore be created in order to get the complete benefits of this development. During short failures of the Doppler velocity sensor unit, the navigation algorithm compensates for missing information. It will be appreciated that it is of prime importance to measure accurately the position and orientation of the position systems on the vehicle in order to perform the coordinate transformations relative to the local frame precisely.

Figure 8:
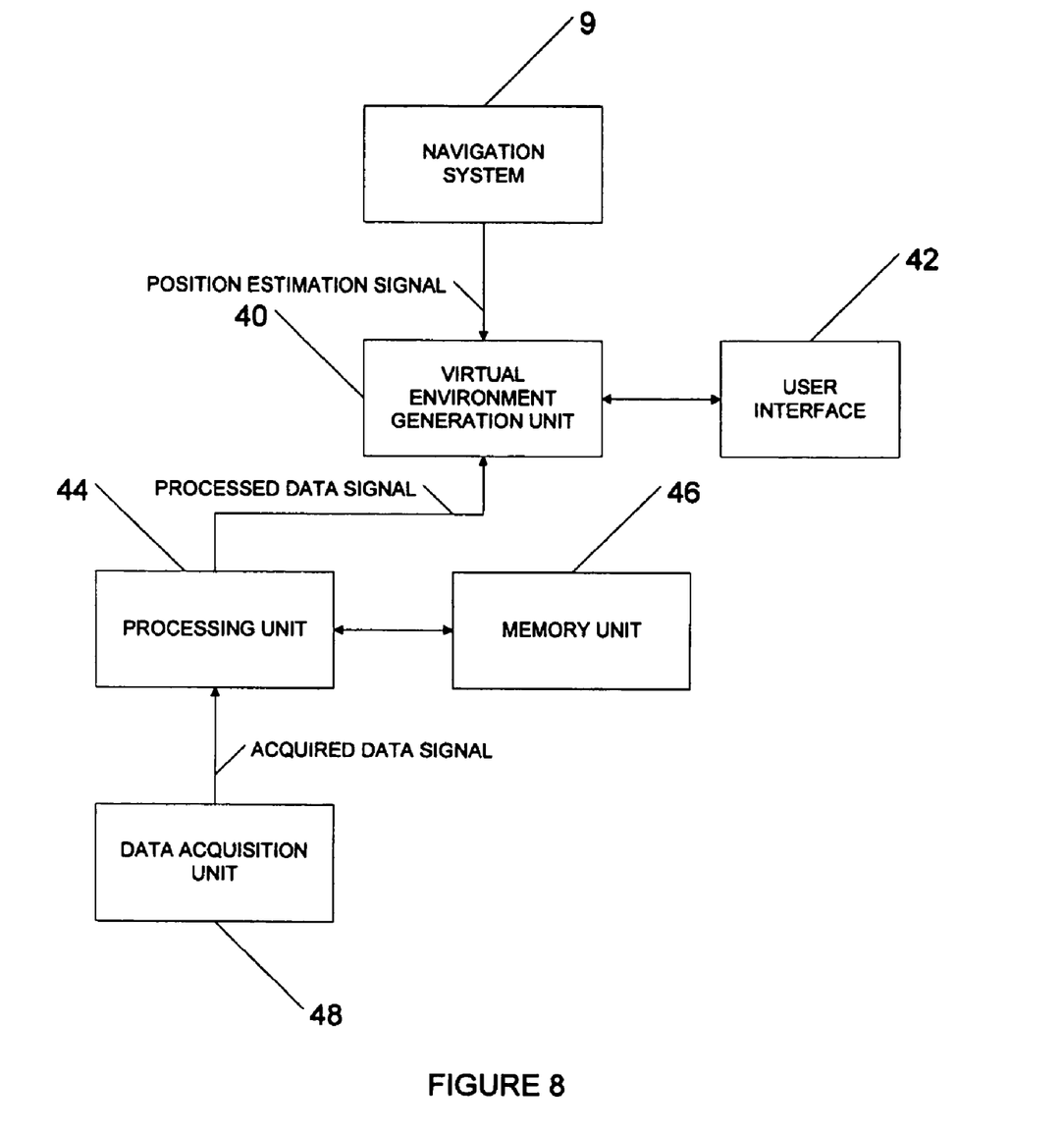
FIG. 8 is a block diagram which shows an embodiment where a navigation system is advantageously used.

Now referring to FIG. 8, there is shown a block diagram which shows how the navigation system 9 may be advantageously used in a remotely operated submarine.

The system comprises the navigation system 9, a virtual environment generation unit 40, a user interface 42, a processing unit 44, a memory unit 46 and a data acquisition unit 48.

The virtual environment generation unit 40 generates a virtual environment where the remotely operated submarine operates as explained below.

The user interface 42 is used to display the generated virtual environment to an operator. The user interface 42 may be also used in order to control the remotely operated submarine.

The data acquisition unit 48 provides an acquired data signal. The data acquisition unit 48 may be any one of a camera, a sonar and a laser. The data acquisition unit 48 is used in order to provide pertinent information collected in the surrounding of the remotely operated vehicle.

The processing unit 44 receives the acquired data signal, processes the received acquired data signal and provides the processed data to the virtual environment generation unit 40.

The memory unit 46 may be used in order to store at least one part of the processed data.

The virtual environment generation unit merges the position estimation signal and the processed data signal to generate the virtual environment. Preferably the generated virtual environment is a 3-dimension view of the remotely operated vehicle together with surrounding objects of interest. The objects of interest are preferably detected using the data acquisition unit 48. Alternatively, the objects of interest may also be inputted, by the operator, in the virtual environment generated by the virtual environment generation unit 40 using the user interface 42. It will be appreciated that the virtual environment may further comprise navigation data related to the remotely operated vehicle. Such navigation data may comprise at least one of orientation, speed, heading, etc.

It will be appreciated that in such embodiment the remotely operated vehicle may be advantageously used, due to its precise navigation system 9 providing the position estimation signal (position in real-time) in order to locate defects, in order to follow up on detected defects, in order to manipulate objects or in order to perform a 3D rebuilding of an immersed structure or of the sea bed.

In the case where the remotely operated vehicle is used to perform a 3D rebuilding of an immersed structure or of the sea bed, the data acquisition unit is a sonar.

In the case where an immersed structure is inspected, the immersed structure may be any one of a dam, an intake structure, a spillway, a stop log, a draft tube, a ship hull, or a bridge pillar.

In the case of a dam or a bridge pillar, cracks, defects, and rock-concrete interfaces may be inspected.

In the case of an intake structure, trash racks, gates, penstocks may be inspected.

In the case of a spillway, gate, concrete, steel and pier may be inspected.

Alternatively, it will be appreciated that hydroelectric turbines may be inspected from water, cavitations erosion damages and cracks may be also inspected.

Alternatively, it will be appreciated that a ship hull may be inspected to detect at least one of a defect, a foreign object and a security threat.

An operation arm may be also connected to the remotely operated vehicle and underwater tasks such as grinding, welding, cleaning, object grabbing may be performed. Stop logs may be unblocked also and damages may be located.

The embodiments of the invention described above are intended to be exemplary only. The scope of the invention is therefore intended to be limited solely by the scope of the appended claims.

We claim:

1. A method for determining a position underwater in real-time of an object, said method comprising:
   sampling an estimation of said position of said object at a first given frequency, with a mean position error equal to zero;
   sampling an estimation of at least one of a velocity and an acceleration of said object at a second given frequency higher than said first given frequency, resulting in a position estimate with a mean error which is not equal to zero; and
   combining said estimation of said position with said estimation of at least one of a velocity and an acceleration to provide said position at said is second given frequency.

2. The method as claimed in claim 1, wherein said combining comprises compensating for a delay between a first time at which said position is estimated and a second time at which said estimated position is available.

3. The method as claimed in claim 1, wherein said combining comprises associating a first weight to said estimation of said position of said object, and a second weight to said estimation of at least one of said velocity and said acceleration.

4. The method as claimed in claim 3, wherein said associating of said first weight to said estimation of said position, and said second weight to said at least one of said estimation of said velocity and said acceleration comprises using Kalman filtering.

5. The method as claimed in claim 1, wherein said estimation of said position is provided using an acoustic position sensor unit.

6. The method as claimed in claim 5, wherein said acoustic position sensor unit provides an X, Y position signal and further wherein a Bathymeter sensor unit provides a Z position signal.

7. The method as claimed in claim 1, wherein an estimation of said velocity is provided, further wherein said sampling of said estimation of said velocity comprises using a Doppler velocity sensor unit.

8. The method as claimed in claim 1, wherein an estimation of said acceleration is provided, further wherein said sampling of said estimation of said acceleration comprises using a gyroscope and accelerometer sensor unit.

9. The method as claimed in claim 1, wherein said object comprises a vehicle, further comprising using said determined position in real-time of said vehicle with an acquired data signal of an immersed structure, provided by a data acquisition unit, in order to perform an inspection of said immersed structure and to further provide a result of said inspection in a virtual environment.

10. The method as claimed in claim 9, wherein said immersed structure comprises at least one of a dam and a bridge pillar and further wherein said inspection is performed in order to inspect at least one of a crack, a rock-concrete interface and a defect.

11. The method as claimed in claim 9, wherein said immersed structure comprises an intake structure and further wherein said inspection is performed in order to inspect at least one of a trash rack, a gate and a penstock.

12. The method as claimed in claim 9, wherein said immersed structure comprises a spillway and further wherein said inspection is performed in order to inspect at least one of a gate, concrete and pier.

13. The method as claimed in claim 9, further comprising manipulating an operation arm, secured to said vehicle in order to perform a task after performing said inspection.

14. The method as claimed in claim 13, wherein said task comprises at least one of welding, grinding, cleaning and grabbing an object.

15. The method as claimed in claim 1, further comprising using said determined position in real-time of said object to perform an inspection of at least one of a stop log and a draft tube.

16. The method as claimed in claim 1, further comprising using said determined position in real-time of said object in order to perform an inspection of an hydroelectric turbine in order to detect at least one of a cavitation erosion damage and a crack.

17. The method as claimed in claim 1, further comprising using said determined position in real-time of said object in order to perform an inspection of a ship hull in order to detect at least one of a defect, a foreign object, and a security threat.

18. An apparatus for determining a position in real-time of an object underwater, said apparatus comprising a position sensor unit having a mean error equal to zero for providing an estimated position signal of said object at a first given frequency;

at least one of an instantaneous velocity sensor unit and an acceleration sensor unit for providing at least one of a corresponding instantaneous velocity signal and a corresponding instantaneous acceleration signal at a second given frequency higher than said first given frequency; and a position providing unit receiving and combining said estimated position signal and said at least one of said corresponding instantaneous velocity signal and said corresponding sampled instantaneous acceleration signal to provide said position signal in real-time at said second given frequency.

19. The apparatus as claimed in claim 18 wherein said position providing unit comprises a Kalman filtering unit receiving said estimated position signal and said at least one of said instantaneous velocity signal and said instantaneous acceleration signal to provide said position signal in real-time for said object.

20. The apparatus as claimed in claim 18, wherein said position sensor unit comprises an acoustic position sensor unit.

21. The apparatus as claimed in claim 19, wherein said acoustic position sensor unit provides an X, Y position signal, further wherein said apparatus further comprises a Bathymeter sensor unit providing a Z position signal.

22. The apparatus as claimed in claim 18, wherein said instantaneous velocity sensor unit comprises a Doppler velocity sensor unit.

23. The apparatus as claimed in claim 18, wherein said instantaneous velocity sensor unit comprises a gyroscope and accelerometer sensor unit.

* * * * *